United States Patent [19]
Uchino et al.

[11] Patent Number: 5,994,434
[45] Date of Patent: Nov. 30, 1999

[54] ADHESION PROMOTER COMPOSITION AND ADHERENT RUBBER COMPOSITION CONTAINING THE SAME

[75] Inventors: Osamu Uchino, Higashiyamato; Shinsuke Nakane; Kanji Fujiki, both of Kodaira; Toru Imori, Toda; Kazunori Iida, Hitachi, all of Japan

[73] Assignees: Bridgestone Corporation, Tokyo, Japan; Japan Energy Corporation, Tokyo, Japan

[21] Appl. No.: 09/029,496

[22] PCT Filed: Jun. 26, 1997

[86] PCT No.: PCT/JP97/02217

§ 371 Date: May 5, 1998

§ 102(e) Date: May 5, 1998

[87] PCT Pub. No.: WO97/49776

PCT Pub. Date: Dec. 31, 1997

[30] Foreign Application Priority Data

Jun. 26, 1996 [JP] Japan ..................................... 8-184260

[51] Int. Cl.$^6$ ........................... C09J 11/04; C09J 121/00; C08K 5/098; C08K 3/24

[52] U.S. Cl. ........................... 524/174; 524/175; 524/176; 524/543; 524/570; 524/571; 524/572; 524/575.5

[58] Field of Search ...................................... 524/174, 175, 524/176, 543, 570, 571, 572, 575.5

[56] References Cited

FOREIGN PATENT DOCUMENTS

| | | |
|---|---|---|
| 6-329839 | 11/1994 | Japan . |
| 6-329840 | 11/1994 | Japan . |
| 7-258476 | 10/1995 | Japan . |

*Primary Examiner*—Nathan M. Nutter
*Attorney, Agent, or Firm*—Sughrue, Mion, Zinn, Macpeak & Seas, PLLC

[57] ABSTRACT

An adhesion promoter composition containing a Zn, K, Al, Ti or Zr metal salt of an organic acid and at least one of a hydrous inorganic salt and an organic molybdenum compound. The adhesion promoter composition may be used to form an adherent rubber composition. The use of the adhesion promoter composition results in an adherent rubber composition which is stable and has a high adhesive force.

19 Claims, No Drawings

ADHESION PROMOTER COMPOSITION AND ADHERENT RUBBER COMPOSITION CONTAINING THE SAME

This application is filed under 35 U.S.C. 371 claiming priority to PCT/JP 97/022A filed Jun. 26, 1997.

FIELD OF THE INVENTION

This invention relates to an adhesion promoter composition and an adherent rubber composition containing the adhesion promoter composition. More particularly the invention relates to (1) an adhesion promoter composition suitable for promoting the adhesion between brass plated steel cord and a rubber composition for coating the steel cord (hereinafter "coating rubber") and (2) an adherent rubber composition containing the adhesion promoter composition.

BACKGROUND OF THE INVENTION

In order to improve performances of automobile tires, conveyor belts and the like, steel cords are generally used as a reinforcing member.

Such steel cords are subjected to a brass plating in order to increase their adhesion to rubber (hereinafter "adhesive force") which thereby enhances their reinforcing effect.

On the other hand, a cobalt salt of an organic acid may be compounded as an adhesion promoter in a rubber composition in order to increase the adhesive force between rubber and steel cord.

However, the use of cobalt is not desirable for safety concerns and due to its high cost. And also, in case of using a cobalt salt of an organic acid, the adhesion property just after vulcanization is excellent, but the adhesion property after thermal aging is poor.

When the other metal salts of organic acids are compounded instead of the cobalt salt of the organic acid, the adhesive force just after vulcanization is poor. Therefore, metal salts of organic acids have not yet been put into practical use as a replacement for cobalt salts.

SUMMARY OF INVENTION

An object of the invention is to provide an adhesion promoter composition being advantageous in safety and economy and having a stably high adhesive force, and an adherent rubber composition containing the adhesion promoter composition.

In order to achieve the above object, the adhesion promoter composition according to the present invention is characterized as follows.

(1) Including a metal salt of an organic acid containing at least one metal selected from the group consisting of Zn, K, Al, Ti and Zr, and a hydrous inorganic salt.

(2) Including a metal salt of an organic acid containing at least one metal selected from the group consisting of Zn, K, Al, Ti and Zr, and an organic molybdenum compound.

(3) In addition to the components of the adhesion promoter composition according to the above item (1), an organic molybdenum compound is further included.

(4) In the adhesion promoter composition according to the above items (1) or (3), a molar ratio ($H_2O$/Me) of water ($H_2O$) in the hydrous inorganic salt to metal (Me) in the metal salt of the organic acid is 0.1–100.

(5) In the adhesion promoter composition according to the above items (2) or (3), a molar ratio (Mo/Me) of molybdenum (Mo) in the organic molybdenum compound to metal (Me) in the metal salt of the organic acid is 0.01–100.

(6) In the adhesion promoter composition according to the above item (3), a molar ratio ($H_2O$/Me) of water ($H_2O$) in the hydrous inorganic salt to metal (Me) in the metal salt of the organic acid is 0.1–100, and a molar ratio (Mo/Me) of molybdenum (Mo) in the organic molybdenum compound to metal (Me) in the metal salt of the organic acid is 0.01–100, and a molar ratio ($H_2O$/Mo) of water ($H_2O$) in the hydrous inorganic salt to molybdenum (Mo) in the organic molybdenum compound is 1–500.

Furthermore, the adherent rubber composition according to the invention is constructed as follows.

(7) Compounding a) at least one rubber ingredient selected from the group consisting of natural rubber and synthetic rubbers, b) an adhesion promoter composition described in any one of the above items (1)–(6), and c) sulfur.

(8) In the adherent rubber composition according to the above item (7), the adhesion promoter composition described in the above item (1) or (4) is compounded in an amount of $2.0 \times 10^{-4}$–$2.0 \times 10^{-2}$ mole calculated in terms of metal in the metal salt of the organic acid and in an amount of $2.5 \times 10^{-3}$–$2.5 \times 10^{-1}$ mole calculated in terms of water in the hydrous inorganic salt, and sulfur is compounded in an amount of 3–8 g, based on 100 g of the rubber ingredient.

(9) In the adherent rubber composition according to the above item (7), the adhesion promoter composition described in the above item (2) or (5) is compounded in an amount of $2.0 \times 10^{-4}$–$2.0 \times 10^{-2}$ mole calculated in terms of metal in the metal salt of the organic acid and in an amount of $2.0 \times 10^{-6}$–$2.0 \times 10$ mole calculated in terms of molybdenum in the molybdenum compound, and sulfur is compounded in an amount of 3–8 g, based on 100 g of the rubber ingredient.

(10) In the adherent rubber composition according to the above item (7), the adhesion promoter composition described in the above item (3) or (6) is compounded in an amount of $2.0 \times 10^{-4}$–$2.0 \times 10^{-2}$ mole calculated in terms of metal in the metal salt of the organic acid and in an amount of $2.5 \times 10^{-3}$–$2.5 \times 10^{-1}$ mole calculated in terms of water in the hydrous inorganic salt and in an amount of $2.0 \times 10^{-6}$–$2.0 \times 10$ mole calculated in terms of molybdenum in the molybdenum compound, and sulfur is compounded in an amount of 3–8 g, based on 100 g of the rubber ingredient.

The present invention is described in further detail below.

[1] The adhesion promoter composition according to the present invention is as follows.

a) The organic acid constituting the metal salt of organic acid containing at least one metal selected from the group consisting of Zn, K, Al, Ti and Zr is not particularly restricted, and may be saturated or unsaturated, and have a straight or branched chain. Also, it may be a bulky fatty acid having a naphthene ring, a benzene ring or the like. Specific examples of organic acid include neodecanoic acid, stearic acid, naphthenic acid, rosin, tall oil acid, oleic acid, linoleic acid, linolenic acid and the like. Further, a part of the organic acid may be substituted with a boron-containing compound, such as boric acid or the like when the metal is multivalent.

Furthermore, the metal constituting the metal salt of organic acid according to the present invention is Zn, K, Al, Ti or Zr. Said metals are advantageous in safety, cost and the like.

Moreover, the metal salts of the organic acid include a plurality of same or different kind of metals being bonded in one molecule, and may be used alone or in a combination thereof.

b) The form of the organic molybdenum compound is not particularly limited, and includes an organic molybdenum sulfur compound having phosphorus or nitrogen such as molybdenum dithiophosphate (Mo-DTP), molybdenum dithiocarbaznate or the like, a molybdenum salt of an organic acid and the like. As the organic acid, the above-mentioned organic acids may be used.

Furthermore, when the metal salt of the organic acid and the organic molybdenum compound are included as components of the adhesion promoter composition, it is allowed to take a state of bonding at least one metal selected from the group consisting of Zn, K, Al, Ti and Zr, and molybdenum together in one molecule.

c) As the hydrous inorganic salt, $NiSO_4.7H_2O$, $CoSO_4.7H_2O$, $NaSO_4.10H_2O$, $CaSO_4.2H_2O$, $CuSO_4.5H_2O$, $Al_2(SO_4)_3.18H_2O$, $FeSO_4\ 7H_2O$, $ZnSO_4.7H_2O$, $MgSO_4.7H_2O$, $Na_2S.9H_2O$, $Na_3PO_4.12H_2O$, $NaH_2PO_4.2H_2O$, $Na_2HPO_4.12H_2O$, $Ni_3(PO_4)_2 8H_2)$, $Mg_3(PO_4)_2.8H_2O$, $Li_3PO_4.5H_2O$, $Na_4P_2O_7.10H_2O$, $Ni_2P_2O_7.6H_2O$, $Mn_4(P_2O_7)_3.14H_2$, $CoCO_3.6H_2O$, $NiCO_3.6H_2O$, $Na_2CO_310H_2O$, $Nd_2(CO_3)_3.8H_2O$, $Na_2SO_3.7H_2O$, $CaCl_2.6H_2O$, $NiCl_2.6H_2O$, $Na_2B_4O_7.10H_2O$, $FeCl_36H_2O$, $Na_2SiO_3.9H_2O$ and the like may be used. By compounding such a hydrous inorganic salt, $H_2O$ contained therein is released, whereby water content may be maintained even when a synthetic rubber having a low water content is compounded or in the winter season of drying air, and hence the lowering of the adhesive force can be avoided. Further, the adhesive force just after vulcanization i.e. an initial adhesive force may be improved.

It is preferable that when the metal salt of the organic acid and the hydrous inorganic salt are included as the ingredients of the adhesion promoter composition, the molar ratio ($H_2O$/Me) of water ($H_2O$) in the hydrous inorganic salt to metal (Me) in the metal salt of the organic acid is 0.1–100. When the molar ratio is less than 0.1, the desired effect may not be obtained, while when it exceeds 100, the water content becomes too large and the adhesion property may be degraded.

Additionally, for the same reasons, the molar ratio is preferably 1–50, more preferably 5–20.

Furthermore, it is preferable that when the metal salt of the organic acid and the organic molybdenum compound are included as the ingredients of the adhesion promoter composition, the molar ratio (Mo/Me) of molybdenum (Mo) in the organic molybdenum compound to metal (Me) in the metal salt of the organic acid is 0.01–100. When the molar ratio is less than 0.01, the effect of compounding the organic molybdenum compound is not obtained, while when it exceeds 100, the cost is increased so as to be undesirable from an economical viewpoint, even though the effect is unchanged.

Additionally, for the same reasons, the molar ratio is preferably 0.03–10, more preferably 0.05–1.0.

Moreover, it is preferable that when the hydrous inorganic salt and the organic molybdenum compound are included as the ingredients of the adhesion promoter composition, the molar ratio ($H_2$/MO) of water ($H_2O$) in the hydrous inorganic salt to molybdenum (Mo) in the organic molybdenum compound is 1–500. When the molar ratio is outside this range, the synergistic effect is not obtained.

Additionally, for the same reasons, the molar ratio is preferably 10–100, more preferably 25–75.

[2] The adherent rubber composition according to the present invention is as follows.

As the rubber ingredient, at least one rubber is selected from natural rubber and synthetic rubbers. The synthetic rubber may be made of styrene-butadiene rubber (SBR), butadiene rubber, butyl rubber, halogenated butyl rubbers, preferably brominated butyl rubber, and butyl rubber having paramethylstyrene group (such as copolymer of isobutylene and p-halogenated methylstyrene, or the like), ethylene-propylene-diene rubber (EPDM), isoprene rubber and the like.

Moreover, it is preferable that the rubber ingredient is at least one of natural rubber and synthetic isoprene rubber in an amount of not less than 50% by weight from a viewpoint of adhesion property and fracture property of rubber.

When the metal salt of the organic acid is included as the component of the adhesion promoter composition, it is preferable to be in the amount of $2.0 \times 10^{-4} - 2.0 \times 10^{-2}$ mole calculated in terms of metal in the metal salt of the organic acid based on 100 g of the rubber ingredient. When it is less than $2.0 \times 10^{-4}$ mole, the desired effects may not be obtained, while when it exceeds $2.0 \times 10^{-2}$ mole, the desired effect is not further improved and the cost becomes higher.

Additionally, for the same reasons, the amount is more preferably $4.0 \times 10^{-4}\ 1.0 \times 10^{-2}$ mole, further more preferably $1.0 \times 10^{-3} - 4.0 \times 10^{-3}$ mole.

Further, when the hydrous inorganic salt is included as the component of the adhesion promoter composition, it is preferably $2.5 \times 10^{-3} - 2.5 \times 10^{-1}$ mole calculated in terms of water in the hydrous inorganic salt based on 100 g of the rubber ingredient. When it is less than $2.5 \times 10^{-3}$ mole, the desired effect may not be obtained, while when it exceeds $2.5 \times 10^{-1}$ mole, the desired effect is not further improved, rather the water content becomes too large and the adhesion property may be lowered.

Additionally, for the same reasons the amount is preferably $5.0 \times 10^{-3} - 2.0 \times 10^{-1}$ mole, further more preferably $7.5 \times 10^{-3} - 7.5 \times 10^{-2}$ mole.

Furthermore, when the organic molybdenum compound is the component of the adhesion promoter composition, it is preferably added in the amount of $2.0 \times 10^{-6} - 2.0 \times 10$ mole calculated in terms of molybdenum in the organic molybdenum compound based on 100 g of the rubber ingredient. When it is less than $2.0 \times 10^{-6}$ mole, the desired effect may not be obtained, while when it exceeds $2.0 \times 10$ mole, the desired effect is not further improved, and the cost becomes higher.

Additionally, for the same reasons, the amount is more preferably $2.0 \times 10^{-5} - 2.0 \times 10^{-2}$ mole, further more preferably $1.0 \times 10^{-4} - 1.0 \times 10^{-3}$ mole.

Further, sulfur is preferably added in the amount of 3–8 g based on 100 g of the rubber ingredient. When it is less than 3 g, sulfur can not be supplied in an amount sufficient to form $Cu_xS$ as a source of developing adhesive force and hence the adhesive force is lowered, while when it exceeds 8 g, $Cu_xS$ is excessively formed and agglomeration fracture of enlarged $Cu_xS$ is created which lowers the adhesive force and further the resistance to thermal aging of the rubber composition is lowered.

Additives usually used in the rubber industry may be compounded in their usual amounts in addition to the above components in the invention.

For example, a filler such as carbon black, silica or the like; a softening agent such as aromatic oil or the like; a vulcanization accelerator, for example, guanidines such as diphenylguanidine or the like, thiazoles such as mercaptobenzothiazole or the like, sulfenamides such as N,N'-dicyclohexyl-2-benzothiazolylsulfenamide or the like, thiurams such as tetramethyithiuram disulfide or the like; an accelerator activator such as zinc oxide or the like; and an antioxidant, for example, poly(2,2,4-trimethyl-1, 2-dihydroquinoline), amines such as phenyl-α-naphthylamine or the like may be added.

Among them, the filler such as carbon black, silica or the like is known as a reinforcing agent for increasing a tensile strength, a strength at rupture, a modulus of elasticity, a hardness and the like of a vulcanized rubber, and improving a wear resistance, a resistance to stretching and the like thereof. Zinc oxide forms a complex compound with a fatty acid and is known as an accelerator activator for enhancing the vulcanization acceleration.

Furthermore, it is preferable that the steel cord to be adhered with the adherent rubber composition according to the invention is subjected to plating with a brass, zinc, or an alloy containing nickel or cobalt therewith for improving the adhesion to rubber, and more preferably to brass plating treatment. A good and stable adhesion is obtained when the Cu content in the brass plating for the steel cord is not more than 75% by weight, preferably 55–70% by weight.

The twisting structure of the cord is not limited particularly.

Further, the production of the adhesion promoter composition according to the invention and the production of the adherent rubber composition containing the adherent promoter composition are carried out in the usual manner.

EXAMPLES

The invention will be described with reference to the examples and comparative examples below.

A rubber composition is prepared according to the compounding recipe described in each table, and further a cord-reinforced rubber is prepared as mentioned later, and tests are conducted by the following methods to obtain results as shown in the same tables.

Table 1 illustrates the effect when the adhesion promoter composition contains a metal salt of an organic acid and a hydrous inorganic salt. Table 2 illustrates the effect when the adhesion promoter composition contains a metal salt of an organic acid and an organic molybdenum compound. Each of Tables 3–6 illustrates the effect when the adhesion promoter composition contains a metal salt of an organic acid, a hydrous inorganic salt and an organic molybdenum compound.

Since the adhesion property is dependent upon the season, the weather and the like, if the day of kneading rubber differs even in the same compounding recipe, the adhesion property may differ. Therefore, in the examples, the day of kneading rubber is same every each table.

Examples 28 and 29 described in Table 3 illustrate the case of previously compounding a metal salt of an organic acid and an organic molybdenum compound, respectively.

(1) Tensile test

After a sample is prepared by vulcanizing each of the rubber composition under condition of 160° C.×20 minutes, it is subjected to a tensile test according to JIS K 6301 to measure a tensile stress at 100% elongation ($M_{100}$) and an elongation at breakage ($E_B$).

(2) Adhesion test

Steel cords (1×5 twisting structure, filament diameter: 0.25 mm) subjected to brass plating (Cu: 63% by weight, Zn: 37% by weight) are arranged side, by side at an interval of 12.5 mm and coated from both sides with each of the rubber compositions and vulcanized under conditions of 160° C.×20 minutes to form a sample of 12.5 mm in thickness, from which a steel cord is pulled out under the following conditions according to ASTM-D-2229 to measure a pulling force. With respect to each of initial adhesion property and adhesion property in aging under the presence of oxygen, the measured value is represented by an index on the basis that each control is 100. The larger the index value, the better the property.

Initial adhesion property

The measurement is carried out just after the above vulcanization.

Adhesion property in aging under the presence of oxygen

After the vulcanization, each sample is aged in air at 120° C. for 7 days for the measurement.

TABLE 1

|  | Example | | | | | Comparative Example | | Example | |
|---|---|---|---|---|---|---|---|---|---|
|  | 1 | 2 | 3 | 4 | 5 | 1 | 2* | 6 | 7 |
| Compound recipe (g) | | | | | | | | | |
| Natural rubber | 100 | 100 | 100 | 100 | 100 | 100 | 100 | 100 | 100 |
| Carbon black | 60 | 60 | 60 | 60 | 60 | 60 | 60 | 60 | 60 |
| Zinc oxide | 8 | 8 | 8 | 8 | 8 | 8 | 8 | 8 | 8 |
| Antioxidant | 2 | 2 | 2 | 2 | 2 | 2 | 2 | 2 | 2 |
| Vulcanization accelerator | 1 | 1 | 1 | 1 | 1 | 1 | 1 | 1 | 1 |
| Sulfur | 5 | 5 | 5 | 5 | 5 | 5 | 5 | 5 | 5 |
| Adhesion promoter composition | | | | | | | | | |
| Zinc neodecanoate | 0.8 | 0.8 | 0.8 | 3 | 7 | — | — | 0.8 | 0.8 |
| $Na_4P_2O_7 \cdot 10H_2O$ | 1 | 3 | 7 | 1 | 1 | — | — | — | — |
| $Na_2SiO_3 \cdot 9H_2O$ | — | — | — | — | — | — | — | 1 | — |
| $Na_2B_6O_7 \cdot 10H_2O$ | — | — | — | — | — | — | — | — | 1 |
| Adhesion promoter for comparison | — | — | — | — | — | — | 0.7 | — | — |
| $H_2O/Me$ (molar ratio) | 9.0 | 26.9 | 62.8 | 2.4 | 1.0 | — | — | 12.8 | 10.4 |

TABLE 1-continued

|  | Example | | | | | Comparative Example | | Example | |
|---|---|---|---|---|---|---|---|---|---|
|  | 1 | 2 | 3 | 4 | 5 | 1 | 2* | 6 | 7 |
| Tensile test | | | | | | | | | |
| $M_{100}$ (MPa) | 5.3 | 5.3 | 5.5 | 5.6 | 5.4 | 4.6 | 5.8 | 5.6 | 4.9 |
| $E_B$ (%) | 331 | 330 | 328 | 324 | 329 | 334 | 301 | 300 | 326 |
| Adhesion test | | | | | | | | | |
| Initial adhesion property (index) | 106 | 106 | 106 | 112 | 106 | 94 | 100 | 112 | 106 |
| Adhesion property in aging under the presence of oxygen (index) | 163 | 125 | 123 | 150 | 110 | 110 | 100 | 175 | 150 |

TABLE 2

|  | Example | | | | Comparative Example | | |
|---|---|---|---|---|---|---|---|
|  | 11 | 12 | 13 | 14 | 11 | 12 | 13* |
| Compound recipe (g) | | | | | | | |
| Natural rubber | 100 | 100 | 100 | 100 | 100 | 100 | 100 |
| Carbon black | 50 | 50 | 50 | 50 | 50 | 50 | 50 |
| Zinc oxide | 8 | 8 | 8 | 8 | 8 | 8 | 8 |
| Antioxidant | 2 | 2 | 2 | 2 | 2 | 2 | 2 |
| Vulcanization accelerator | 1 | 1 | 1 | 1 | 1 | 1 | 1 |
| Sulfur | 5 | 5 | 5 | 5 | 5 | 5 | 5 |
| Adhesion promoter composition | | | | | | | |
| Zinc neodecanoate | 0.9 | 0.9 | 0.9 | 0.9 | — | 0.9 | — |
| Molybdenum neodecanoate | — | — | 0.3 | — | — | — | — |
| Molybdenum naphthenate | 0.3 | 0.6 | — | — | — | — | — |
| Mo-DTP | — | — | — | 0.3 | — | — | — |
| Cobalt neodecanoate | — | — | — | — | — | — | 1.2 |
| Mo/Me (molar ratio) | 0.20 | 0.40 | 0.29 | 0.21 | — | — | — |
| Tensile test | | | | | | | |
| $M_{100}$ (MPa) | 4.8 | 5.1 | 4.9 | 5.1 | 2.5 | 4.7 | 5.0 |
| $E_B$ (%) | 420 | 409 | 423 | 403 | 375 | 425 | 400 |
| Adhesion test | | | | | | | |
| Initial adhesion property (index) | 105 | 105 | 105 | 100 | 11 | 33 | 100 |
| Adhesion property in aging under the presence of oxygen (index) | 130 | 145 | 120 | 120 | 100 | 100 | 100 |

TABLE 3

|  | Example | | | | | | | | | | | Comparative Example | |
|---|---|---|---|---|---|---|---|---|---|---|---|---|---|
|  | 21 | 22 | 23 | 24 | 25 | 26 | 27 | 28 | 29 | 30 | 31 | 21 | 22* |
| Compounding recipe (g) | | | | | | | | | | | | | |
| Natural rubber | 100 | 100 | 100 | 100 | 100 | 100 | 100 | 100 | 100 | 100 | 100 | 100 | 100 |
| Carbon black | 60 | 60 | 60 | 60 | 60 | 60 | 60 | 60 | 60 | 60 | 60 | 60 | 60 |
| Zinc oxide | 8 | 8 | 8 | 8 | 8 | 8 | 8 | 8 | 8 | 8 | 8 | 8 | 8 |
| Antioxidant | 2 | 2 | 2 | 2 | 2 | 2 | 2 | 2 | 2 | 2 | 2 | 2 | 2 |
| Vulcanization accelerator | 1 | 1 | 1 | 1 | 1 | 1 | 1 | 1 | 1 | 1 | 1 | 1 | 1 |
| Sulfur | 5 | 5 | 5 | 5 | 5 | 5 | 5 | 5 | 5 | 5 | 5 | 5 | 5 |

TABLE 3-continued

|  | Example |  |  |  |  |  |  |  |  |  |  | Comparative Example |  |
|---|---|---|---|---|---|---|---|---|---|---|---|---|---|
|  | 21 | 22 | 23 | 24 | 25 | 26 | 27 | 28 | 29 | 30 | 31 | 21 | 22* |
| Adhesion promoter composition |  |  |  |  |  |  |  |  |  |  |  |  |  |
| Zinc neodecanoate | 0.9 | 0.9 | 0.9 | 0.9 | 3 | 5 | 0.9 | 0.72 | 0.79 | 0.9 | 0.9 | — | — |
| Molybdenum naphthenate | 0.05 | 0.3 | 0.9 | 5 | 1 | 2 | — | 0.28 | — | 0.3 | 0.3 | — | — |
| Mo—DTP | — | — | — | — | — | — | 0.3 | — | 0.31 | — | — | — | — |
| $Na_2B_4O_7 \cdot 10H_2O$ | 1 | 1 | 1 | 1 | 1 | 1 | 1 | 1 | 1 | 3 | 7 | — | — |
| Adhesion promoter for comparison | — | — | — | — | — | — | — | — | — | — | — | — | 0.7 |
| $H_2O$/Me (molar ratio) | 9.3 | 9.3 | 9.3 | 9.3 | 3.1 | 1.9 | 9.3 | 11.8 | 10.4 | 28.2 | 65.4 | — | — |
| Mo/Me (molar ratio) | 0.03 | 0.20 | 0.61 | 3.4 | 0.22 | 0.27 | 0.02 | 0.24 | 0.24 | 0.20 | 0.20 | — | — |
| Tensile test |  |  |  |  |  |  |  |  |  |  |  |  |  |
| $M_{100}$ (MPa) | 3.2 | 3.2 | 3.4 | 3.5 | 3.6 | 3.9 | 3.8 | 3.2 | 3.5 | 3.7 | 3.8 | 3.4 | 4.3 |
| $E_B$ (%) | 434 | 426 | 428 | 424 | 420 | 416 | 392 | 449 | 426 | 425 | 423 | 442 | 415 |
| Adhesion test |  |  |  |  |  |  |  |  |  |  |  |  |  |
| Initial adhesion property (index) | 108 | 121 | 121 | 121 | 121 | 115 | 100 | 121 | 107 | 121 | 100 | 29 | 100 |
| Adhesion property in aging under the presence of oxygen (index) | 105 | 125 | 125 | 113 | 113 | 105 | 113 | 113 | 125 | 113 | 113 | 78 | 100 |

TABLE 4

|  | Example |  |  | Comparative Example |  |
|---|---|---|---|---|---|
|  | 41 | 42 | 43 | 41 | 42* |
| Compounding recipe (g) |  |  |  |  |  |
| Natural rubber | 100 | 100 | 100 | 100 | 100 |
| Carbon black | 60 | 60 | 60 | 60 | 60 |
| Zinc oxide | 8 | 8 | 8 | 8 | 8 |
| Antioxidant | 2 | 2 | 2 | 2 | 2 |
| Vulcanization accelerator | 1 | 1 | 1 | 1 | 1 |
| Sulfur | 5 | 5 | 5 | 5 | 5 |
| Adhesion promoter composition |  |  |  |  |  |
| Zinc neodecanoate | 0.9 | 0.9 | 3 | — | — |
| Molybdenum naphthanate | 0.3 | 3 | 0.3 | — | — |
| $Na_4P_2O_7 \cdot 10H_2O$ | 1 | 1 | 1 | — | — |
| Adhesion promoter for comparison | — | — | — | — | 0.7 |
| $H_2O$/Me (molar ratio) | 7.9 | 7.9 | 2.6 | — | — |
| Mo/Me (molar ratio) | 0.20 | 2.05 | 0.07 | — | — |
| Tensile test |  |  |  |  |  |
| $M_{100}$ (MPa) | 5.2 | 5.5 | 5.5 | 4.6 | 5.8 |
| $E_B$ (%) | 316 | 325 | 331 | 334 | 301 |
| Adhesion test |  |  |  |  |  |
| Initial adhesion property (index) | 129 | 121 | 114 | 86 | 100 |
| Adhesion property in aging under the presence of presence of oxygen (index) | 162 | 155 | 143 | 60 | 100 |

TABLE 5

|  | Example |  |  |  |  | Comparative Example | Example |
|---|---|---|---|---|---|---|---|
|  | 51 | 52 | 53 | 54 | 55 | 51* | 56 |
| Compounding recipe (g) |  |  |  |  |  |  |  |
| Natural rubber | 100 | 100 | 100 | 100 | 100 | 100 | 70 (NR) 30 (SBR) |
| Carbon black | 60 | 60 | 60 | 60 | 60 | 60 | 60 |
| Zinc oxide | 8 | 8 | 8 | 8 | 8 | 8 | 8 |
| Antioxidant | 2 | 2 | 2 | 2 | 2 | 2 | 2 |

TABLE 5-continued

|  | Example | | | | | Comparative Example | Example |
| --- | --- | --- | --- | --- | --- | --- | --- |
|  | 51 | 52 | 53 | 54 | 55 | 51* | 56 |
| Vulcanization accelerator | 1 | 1 | 1 | 1 | 1 | 1 | 1 |
| Sulfur | 5 | 5 | 5 | 5 | 5 | 5 | 5 |
| Adhesion promoter composition | | | | | | | |
| Zinc neodecanoate | 0.8 | — | — | — | — | — | 0.8 |
| Zinc naphthenate | — | 0.9 | 0.9 | — | — | — | — |
| Zinc rosinate | — | — | — | 1.8 | — | — | — |
| Zinc salt of tall oil acid | — | — | — | — | 1.4 | — | — |
| Molybdenum neodecanoate | — | — | 1.0 | — | — | — | — |
| Molybdenum naphthenate | 0.2 | 0.2 | — | 0.2 | 0.2 | — | 0.2 |
| $Na_4P_2O_7 \cdot 10H_2O$ | 1.0 | 1.0 | 1.0 | 1.0 | 1.0 | — | 1.0 |
| Adhesion promoter for comparison | — | — | — | — | — | 0.7 | — |
| $H_2O/Me$ (molar ratio) | 9.0 | 9.3 | 8.3 | 9.0 | 8.6 | — | 10.2 |
| Mo/Me (molar ratio) | 0.15 | 0.16 | 0.14 | 0.15 | 0.15 | — | 0.17 |
| Tensile test | | | | | | | |
| $M_{100}$ (MPa) | 5.3 | 5.2 | 5.3 | 5.2 | 5.6 | 5.7 | 5.5 |
| $E_B$ (%) | 324 | 330 | 321 | 350 | 320 | 307 | 310 |
| Adhesion test | | | | | | | |
| Initial adhesion property (index) | 135 | 115 | 135 | 130 | 145 | 100 | 100 |
| Adhesion property in aging under the presence of oxygen (index) | 170 | 170 | 120 | 120 | 190 | 100 | 175 |

TABLE 6

|  | Example | | | | | Comparative Example |
| --- | --- | --- | --- | --- | --- | --- |
|  | 61 | 62 | 63 | 64 | 65 | 61* |
| Compounding recipe (g) | | | | | | |
| Natural rubber | 100 | 100 | 100 | 100 | 100 | 100 |
| Carbon black | 60 | 60 | 60 | 60 | 60 | 60 |
| Zinc oxide | 8 | 8 | 8 | 8 | 8 | 8 |
| Antioxidant | 2 | 2 | 2 | 2 | 2 | 2 |
| Vulcanization accelerator | 1 | 1 | 1 | 1 | 1 | 1 |
| Sulfur | 5 | 5 | 5 | 5 | 5 | 5 |
| Adhesion promoter composition | | | | | | |
| Zinc neodecanoate | 0.8 | — | — | — | — | — |
| Aluminum neodecanoate | — | 1.0 | — | — | — | — |
| Titanium neodecanoate | — | — | 1.0 | — | — | — |
| Potassium neodecanoate | — | — | — | 0.7 | — | — |
| Zirconium neodecanoate | — | — | — | — | 1.0 | — |
| Molybdenum naphthenate | 0.2 | 0.2 | 0.2 | 0.2 | 0.2 | — |
| $Na_4P_2O_7 \cdot 10H_2O$ | 1.0 | 1.0 | 1.0 | 1.0 | 1.0 | — |
| Adhesion promoter for comparison | — | — | — | — | — | 0.7 |
| $H_2O/Me$ (molar ratio) | 9.0 | 9.7 | 8.6 | 7.4 | 9.0 | — |
| Mo/Me (molar ratio) | 0.15 | 0.16 | 0.15 | 0.12 | 0.15 | — |
| Tensile test | | | | | | |
| $M_{100}$ (MPa) | 4.1 | 3.8 | 3.6 | 4.0 | 3.4 | 4.2 |
| $E_B$ (%) | 427 | 395 | 418 | 415 | 418 | 412 |
| Adhesion text | | | | | | |
| Initial adhesion property (index) | 135 | 126 | 135 | 135 | 116 | 100 |
| Adhesion property in aging under the presence of oxygen (index) | 170 | 135 | 122 | 131 | 115 | 100 |

Natural rubber: RSS#4, trade name, made by Tech Behung Co,, Ltd.

SBR: Toughden 2000R, trade name, made by Asahi Chemical Industry Co., Ltd. (used in only Example 57)

Carbon black: N330 (N326 is used in only a compounding recipe of Table 6)

Antioxidant: Nocrac 6C, trade name, made by Ohuchi Shinko Kagaku Kogyo Co-, Ltd.

N-(1,3-dimethylbutyl)-N'-phenyl-p-phenylene diamine

Vulcanization accelerator: Nocceler DZ, trade name, made by Ohuchi Shinko Kagaku Kogyo Co., Ltd N,N'-dicyclohexyle-2-benzothiazolyl sulfenamide Adhesion promoter for comparison: Manobond C22.5, trade name, made by Rhone-Poulenc Viscosuisse SA.

* mark: This mark shows a control in each table when each of the initial adhesion property and the adhesion property in aging under the presence of oxygen is represented by an index.

Furthermore, a ratio of an effective component (metal) in the metal salt of organic acid or the organic molybdenum compound used in each table is shown in Table 7. In this case, ○ mark corresponds to Example 28 and ⊙ mark Example 29, respectively.

TABLE 7

| Compound | Effective component (% bye weight) |
|---|---|
| Zinc neodecanoate | 20.4 |
| Molybdenum naphthenate | 18.2 |
| Zinc naphthenate | 17.6 |
| Zinc rosinate | 8.9 |
| Zinc salt of tall oil acid | 12.3 |
| Aluminum neodecanoate | 6.3 |
| Titanium neodecanoate | 12.5 |
| Potassium neodecanoate | 17.0 |
| Zirconium neodecanoate | 22.7 |
| Cobalt neodecanoate | 14.2 |
| Molybdenum neodecanoate | 25.9 |
| Mo—DTP | 19.1 |
| ○ Zinc neodecanoate/ Molybedenum naphthenoate | (Zn)12.3 (Mo)4.3 |
| ⊙ Zinc neodecanoate/Mo—DTP | (Zn)13.4 (Mo)4.92 |

As seen from Table 1, when the metal salt of organic acid and the hydrous inorganic salt are included, both the initial adhesion property and the adhesion property in aging under the presence of oxygen are improved. And also, the effect is observed even when the kind of the hydrous inorganic salt is varied.

As seen from Table 2, when the metal salt of organic acid and the organic molybdenum compound are included, the initial adhesion property and the adhesion property in aging under the presence of oxygen, particularly the latter property are improved. Moreover, the effect is observed irrespectively of the kind of the organic molybenum compound.

As seen from Table 3, when the metal salt of organic acid, the hydrous inorganic salt and the organic molybdenum compound are included, both the initial adhesion property and the adhesion property in aging under the presence of oxygen are effectively improved The effect is observed irrespectively of the molar ratio of $H_2O/Me$ and the molar ratio of Mo/Me.

As seen from Table 4, a considerable improvement of the desired effect is obtained when the metal salt of organic acid, the hydrous inorganic salt and the organic molybdenum compound are included—

As seen from Table 5, the desired effect is observed irrespectively of the kind of the organic acid constituting the metal salt of organic acid and of the organic molybdenum compound.

As seen from Table 6, the desired effect is observed irrespectively of the kind of the metal constituting the metal salt of organic acid.

As seen from the above, each of examples has a stable adhesion property on a high level without degradation of rubber properties.

INDUSTRIAL APPLICABILITY

The metal salts of organic acid except for cobalt have not been put into practical use because the adhesive force just after vulcanization is poor. According to the invention, however, when a specified metal salt of organic acid except for cobalt is used, in combination with the hydrous inorganic salt or the organic molybdenum compound, is obtained an adhesion promoter composition improved in safety and economy concerns and also having an improved adhesive force Likewise, the adherent rubber composition containing the adhesion promoter is similarly improved.

Furthermore, a higher initial adhesive force is obtained by adding the hydrous inorganic salt and the organic molybdenum compound to the specified metal salt of organic acid according to the invention, and can stably be maintained.

Therefore, the invention can particularly be applied for adhesion promotion between a steel cord subjected to brass plating and the rubber for coating the steel cord.

We claim:

1. An adhesion promoter composition comprising
    a metal salt of an organic acid containing at least one metal selected from the group consisting of Zn, K, Al, Ti and Zr, and
    a hydrous inorganic salt.

2. An adhesion promoter composition comprising
    a metal salt of an organic acid containing at least one metal selected from the group consisting of Zn, K, Al, Ti and Zr, and
    an organic molybdenum compound.

3. The adhesion promoter composition according to claim 1, further comprising an organic molybdenum compound.

4. The adhesion promoter composition according to claim 1, wherein a molar ratio ($H_2O/Me$) of water ($H_2O$) in the hydrous inorganic salt to metal (Me) in the metal salt of the organic acid is 0.1–100.

5. The adhesion promoter composition according to claim 3, wherein a molar ratio (Mo/Me) of molybdenum (Mo) in the organic molybdenum compound to metal (Me) in the metal salt of the organic acid is 0.01–100.

6. The adhesion promoter composition according to claim 3, wherein a molar ratio ($H_2O/Me$) of water ($H_2O$) in the hydrous inorganic salt to metal (Me) in the metal salt of the organic acid is 0.1–100, and a molar ratio (Mo/Me) of molybdenum (Mo) in the organic molybdenum compound to metal (Me) in the metal salt of the organic acid is 0.01–100, and a molar ratio ($H_2O/Mo$) of water ($H_2O$) in the hydrous inorganic salt to molybdenum (Mo) in the organic molybdenum compound is 1–500.

7. The adhesion promoter composition according to claim 3, wherein a molar ratio ($H_2O/Me$) of water ($H_2O$) in the hydrous inorganic salt to metal (Me) in the metal salt of the organic acid is 0.1–100.

8. The adhesion promoter composition according to claim 2, wherein a molar ratio (Mo/Me) of molybdenum (Mo) in the organic molybdenum compound to metal (Me) in the metal salt of the organic acid is 0.01–100.

9. An adherent rubber composition characterized by compounding at least:
    a) at least one rubber ingredient selected from the group consisting of natural rubber and synthetic rubbers,
    b) an adhesion promoter composition comprising
        a metal salt of an organic acid containing at least one metal selected from the group consisting of Zn, K, Al, Ti and Zr, and
        an organic molybdenum compound, and
    c) sulfur.

10. The adherent rubber composition according to claim 9, wherein the adhesion promoter composition comprises a molar ratio (Mo/Me) of molybdenum (Mo) in the organic molybdenum compound to metal (Me) in the metal salt of the organic acid of 0.01–100.

11. An adherent rubber composition characterized by compounding at least:
    a) at least one rubber ingredient selected from the group consisting of natural rubber and synthetic rubbers,
    b) an adhesion promoter composition comprising
        a metal salt of an organic acid containing at least one metal selected from the group consisting of Zn. K. Al, Ti and Zr, and a hydrous inorganic salt, and c) sulfur.

12. The adherent rubber composition according to claim 11, wherein the adhesion promoter composition further comprises an organic molybdenum compound.

13. The adherent rubber composition according to claim 11, wherein the adhesion promoter composition comprises a molar ratio ($H_2O$/Me) of water ($H_2O$) in the hydrous inorganic salt to metal (Me) in the metal salt of the organic acid of 0.1–100.

14. The adherent rubber composition according to claim 12, wherein the adhesion promoter composition comprises a molar ratio ($H_2O$/Me) of water ($H_2O$) in the hydrous inorganic salt to metal (Me) in the metal salt of the organic acid of 0.1–100.

15. The adherent rubber composition according to claim 12, wherein the adhesion promoter composition comprises a molar ratio (Mo/Me) of molybdenum (Mo) in the organic molybdenum compound to metal (Me) in the metal salt of the organic acid of 0.01–100.

16. The adherent rubber composition according to claim 12, wherein the adhesion promoter composition comprises a molar ratio ($H_2O$/Me) of water ($H_2O$) in the hydrous inorganic salt to metal (Me) in the metal salt of the organic acid of 0.1 to 100, and a molar ratio (Mo/Me) of molybdenum (Mo) in the organic molybdenum compound to metal (Me) in the metal salt of the organic acid is 0.01–100, and a molar ratio ($H_2O$/Mo) of water ($H_2O$) in the hydrous inorganic salt to molybdenum (Mo) in the organic molybdenum compound is 1–500.

17. The adherent rubber composition according to claims 11, 13, or 14, wherein the adhesion promoter composition is compounded in an amount of $2.0 \times 10^{-4}$–$2.0 \times 10^{-2}$ mole calculated in terms of metal in the metal salt of the organic acid and in an amount of $2.5 \times 10^{-3}$–$2.5 \times 10^{-1}$ mole calculated in terms of water in the hydrous inorganic salt, and the sulfur is compounded in an amount of 3–8 g, based on 100 g of the rubber ingredient.

18. The adherent rubber composition according to claims 15, 9 or 10; wherein the adhesion promoter composition is compounded in an amount of $2.0 \times 10^{-4}$–$2.0 \times 10^{-2}$ mole calculated in terms of metal in the metal salt of the organic acid and in an amount of $2.0 \times 10^{-6}$–$2.0 \times 10$ mole calculated in terms of molybdenum in the organic molybdenum compound, and the sulfur is compounded in an amount of 3–8 g, based on 100 g of the rubber ingredient.

19. The adherent rubber composition according to claims 12 or 16, wherein the adhesion promoter composition is compounded in an amount of $2.0 \times 10^{-4}$–$2.0 \times 10^{-2}$ mole calculated in terms of metal in the metal salt of the organic acid and in an amount of $2.5 \times 10^{-3}$ –$2.5 \times 10^{-1}$ mole calculated in terms of water in the hydrous inorganic salt and in an amount of $2.0 \times 10^{-6}$–$2.0 \times 10$ mole calculated in terms of molybdenum in the organic molybdenum compound, and the sulfur is compounded in an amount of 3–8 g, based on 100 g of the rubber ingredient.

* * * * *